United States Patent
Ng

(10) Patent No.: US 7,324,240 B2
(45) Date of Patent: Jan. 29, 2008

(54) COLOR CORRECTION METHOD WITH TRANSPARENT TONER INSIGNIA IMAGES

(75) Inventor: Yee S. Ng, Fairport, NY (US)

(73) Assignee: Eastman Kodak Company, Rochester, NY (US)

(*) Notice: Subject to any disclaimer, the term of this patent is extended or adjusted under 35 U.S.C. 154(b) by 761 days.

(21) Appl. No.: 10/836,803

(22) Filed: Apr. 30, 2004

(65) Prior Publication Data
US 2005/0243341 A1 Nov. 3, 2005

(51) Int. Cl.
G06F 15/00 (2006.01)
G03F 3/08 (2006.01)
H04N 1/46 (2006.01)

(52) U.S. Cl. .................. 358/1.9; 358/518; 358/504
(58) Field of Classification Search ............... 358/1.9, 358/504, 518, 501, 1.1, 520, 530, 1.6; 382/167, 382/162
See application file for complete search history.

(56) References Cited

U.S. PATENT DOCUMENTS

| 4,739,377 | A | 4/1988 | Allen .................. 355/133 |
| 5,234,783 | A | 8/1993 | Ng ..................... 430/45 |
| 5,339,146 | A | 8/1994 | Aslam et al. ........... 355/285 |
| 2004/0001233 | A1 | 1/2004 | Wang et al. ............ 358/3.06 |
| 2004/0004731 | A1* | 1/2004 | Itagaki ................. 358/1.9 |
| 2006/0114481 | A1* | 6/2006 | Moore .................. 358/1.9 |
| 2006/0133870 | A1* | 6/2006 | Ng et al. ............... 399/341 |
| 2006/0188301 | A1* | 8/2006 | Ng et al. ............... 399/341 |
| 2006/0239729 | A1* | 10/2006 | Okamoto .............. 399/342 |
| 2006/0247545 | A1* | 11/2006 | St. Martin ............ 600/509 |
| 2006/0251450 | A1* | 11/2006 | Murayama et al. ..... 399/299 |
| 2006/0285890 | A1* | 12/2006 | Ng ...................... 399/329 |
| 2007/0048653 | A1* | 3/2007 | Ide ..................... 430/120 |
| 2007/0115487 | A1* | 5/2007 | Ide et al. ............... 358/1.4 |
| 2007/0127940 | A1* | 6/2007 | Zaima .................. 399/53 |
| 2007/0171444 | A1* | 7/2007 | Washino ............... 358/1.9 |

FOREIGN PATENT DOCUMENTS

| JP | 2005266322 | * 3/2004 |
| JP | 2004341242 | * 12/2004 |

* cited by examiner

Primary Examiner—Madeleine AV Nguyen
(74) Attorney, Agent, or Firm—Lawrence P. Kessler; Robert L. Walker

(57) ABSTRACT

A method for color correction of an image having an insignia portion in a multi-module printer (10). A first color profile is calibrated for a four-color image. A second color profile is calibrated for a four-color image with a transparent toner layer on top of the insignia portion of the four-color image. The image data is then buffered in a color input band buffer (40) and processed through the first (50) and second (60) color profiles in a color management module. The processed image data is stored in an output band buffer (70, 80) corresponding to the image data processed through each color profile. Clear toner input band data stored in a clear toner input band buffer (30) is compared with the processed image data in each output band buffer (70, 80) to select an output signal (100) on a per pixel basis to send to the multi-module printer (10).

14 Claims, 7 Drawing Sheets

COLOR CORRECTION METHOD WITH TRANSPARENT TONER INSIGNIA IMAGES

FIELD OF THE INVENTION

The present invention relates generally to color printing processes and, more particularly, to color correction techniques using transparent toner images.

BACKGROUND OF THE INVENTION

Typical printing processes include four-color imaging units or modules having ink or toner of standard colors such as cyan, magenta, yellow and black which represent the CMYK color model. These four imaging units are capable of printing a color gamut that includes most of the colors that are required by customer print job orders.

When transparent toner is used as an insignia (or authentication mark) on top of the color image, the color below the transparent toner will be affected depending on the amount of clear toner laydown, paper substrate type, and amount of underlying color toners as well as the fusing condition. If the transparent toner is used over the whole color image, then a new color profile can be generated for that image under coverage by the transparent toner layer (with either full coverage or inverse mask coverage). However if the insignia is used only over a portion of the image, then the color below the transparent toner is different than that on the adjacent region without transparent toner when the same color profile is used for the color toner image. So not only is the gloss level of the insignia different than the image below, but also the color below the transparent toner is affected. In some cases, it is distracting for the viewer, who is supposed to see the insignia of different gloss if viewed at an angle different than the normal viewing angle of the image, to see the color change of the image under the insignia which is created for an authentication purpose or esthetic effect when viewed at a different angle. Therefore, it is desirable to create an insignia system with the transparent toner, so that the color under the transparent toner is similar to color adjacent to it. The transparent toner insignia can be created with a slightly different gloss level that can be visible when viewed at a non-normal viewing angle.

Various color models are referenced in the detailed description of the invention, so the following background is provided as a brief point of reference for the invention description. The RGB (red/green/blue) color model is based on adding light, i.e., colors are created by emitting red, green and blue beams of light. In the RGB color model, pixel colors can be changed by combining various values of red, blue and green. Each primary color has a range of values from 0 to 255. Thus, with 256 possible values of each primary color, the total number of possible colors is approximately 16.7 million. Printing technology uses a combination of cyan, magenta, yellow and black inks that reflect and absorb various wavelengths of light. Colors created by overprinting these four colors are part of the CMYK color model. The CMYK color model is the basis for four color process printing, to print continuous tone images on a commercial printer. In four color process printing, colors are reproduced on a commercial printer by using four different plates: cyan, magenta, yellow and black. By combining inks of cyan, magenta and yellow, a commercial printer can reproduce a significant portion of the visible spectrum of colors.

The Lab (or CIE Lab) color model provides a means for creating consistent, device-independent color, so that colors should not vary regardless of the monitor or printer used. The Lab color model is based on changes in a color's lightness (L values from 0 to 100), an "a" axis of colors ranging from green to magenta, and a "b" axis of colors ranging from blue to yellow. In the description that follows, perceptual space refers to the human perceptual space. The International Commission on Illumination (CIE Commission Internationale de l'Eclairage) has attempted to create a uniform color space so that an equal color difference (deltaE) in one color region can have a similar perceptual difference in another color region.

Color perception is a sensory perception triggered by the color in the brain of an observer. Describing the color has two components: a chromatic stimulus which is the measurable radiation reflected by an observed body; and a color stimulus specification which is the result of the visual perception in the eye of the observer.

Gloss is a perception based on the physical, optical property of a surface to reflect projected light more or less secularly. Gloss is a characteristic of the surface of a material. Toner is the color substance used in electrophotography. The toner particles are charged electrostatically in the developing unit and are attracted to the drum by the oppositely charged image portions of the photoconductor.

The gamut is a term in the art for the visible color range of a color model. For example, the gamut of RGB color model is larger than that of CMYK color module. The Lab color gamut encompasses the color gamuts of both RGB and CMYK.

SUMMARY OF INVENTION

With the substrate and fusing condition defined, the printing system can be calibrated with a first color profile for four color printing in a five module printing process and a second color profile for the four color printing in a five module printing process with transparent toner on top of the four color image. For convenience, these color profiles are referred to herein as profile A and profile B, respectively. Since the addition of the transparent toner, having a similar viscosity as the four color toners on top of the color toner, appears to reduce the color gamut of the four color toned image after fusing, the full exposure/development range can be used for the four color image with transparent toner on top to build the second profile (i.e., profile B). As for the four-color profile without the transparent toner (profile A), the slightly less than full exposure/development range can be used in mapping for the four color images. As a result, the actual output gamut ranges for both the four colors plus transparent process and the four-color process only produce a similar result. Then, in the printing process, the four-color image data can receive a tag from the transparent toner layer so that the four-color image that has transparent toner on top can use a different color profile than the four-color image that has no transparent toner on top. The result is a matching of the color of the image even with a transparent toner insignia on top of part of the image. Furthermore, it is not necessary to restrict the process to two color profiles only. Different gloss effects for insignia can be achieved without creating color differences between image area with transparent toner insignia and that without transparent toner if multiple color profiles are allowed depending on the amount of the transparent toner laydown. The level of toner laydown can trigger a different flag that utilizes a different color profile.

In one aspect of the invention, a method is provided for color correction of an image having an insignia portion in a multi-module printer. A first color profile is calibrated for a four-color image. A second color profile is calibrated for a four-color image with a transparent toner layer on top of the insignia portion of the four-color image. The image data is then buffered in a color input band buffer and processed through the first and second color profiles in a color management module. The processed image data is stored in an output band buffer corresponding to the image data processed through each color profile. Clear toner input band data stored in a clear toner input band buffer is compared with the processed image data in each output band buffer to select an output signal on a per pixel basis to send to the multi-module printer.

In another aspect of the invention, a method is provided for color correction of an image having an insignia portion using multiple color profiles. A plurality of color profiles are calibrated for a color image. A color image signal in an input image space is inputted into a color management module. The input color image signal is then mapped into a device-independent color space and processed for each color profile to determine an absolute calorimetric intent for the mapped color image signal. The processed image data for each profile is stored in a separate output buffer. The processed image data in the output buffers is then blended based on a clear dry ink level at each pixel location in the image and sending the blended image data to a multi-module printer. In this case, all profiles are built with the full range of exposure/development available.

BRIEF DESCRIPTION OF THE DRAWINGS

The invention is better understood by reading the following detailed description of the invention in conjunction with the accompanying drawings, wherein.

DETAILED DESCRIPTION OF THE INVENTION

The following description of the present invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without using other features. Accordingly, those who work in the art will recognize that many modifications and adaptations to the present invention are possible, and may even be desirable in certain circumstances, and are a part of the present invention. Thus, the following description is provided as illustrative of the principles of the present invention and not in limitation thereof, since the scope of the present invention is defined by the claims.

Figure 1:
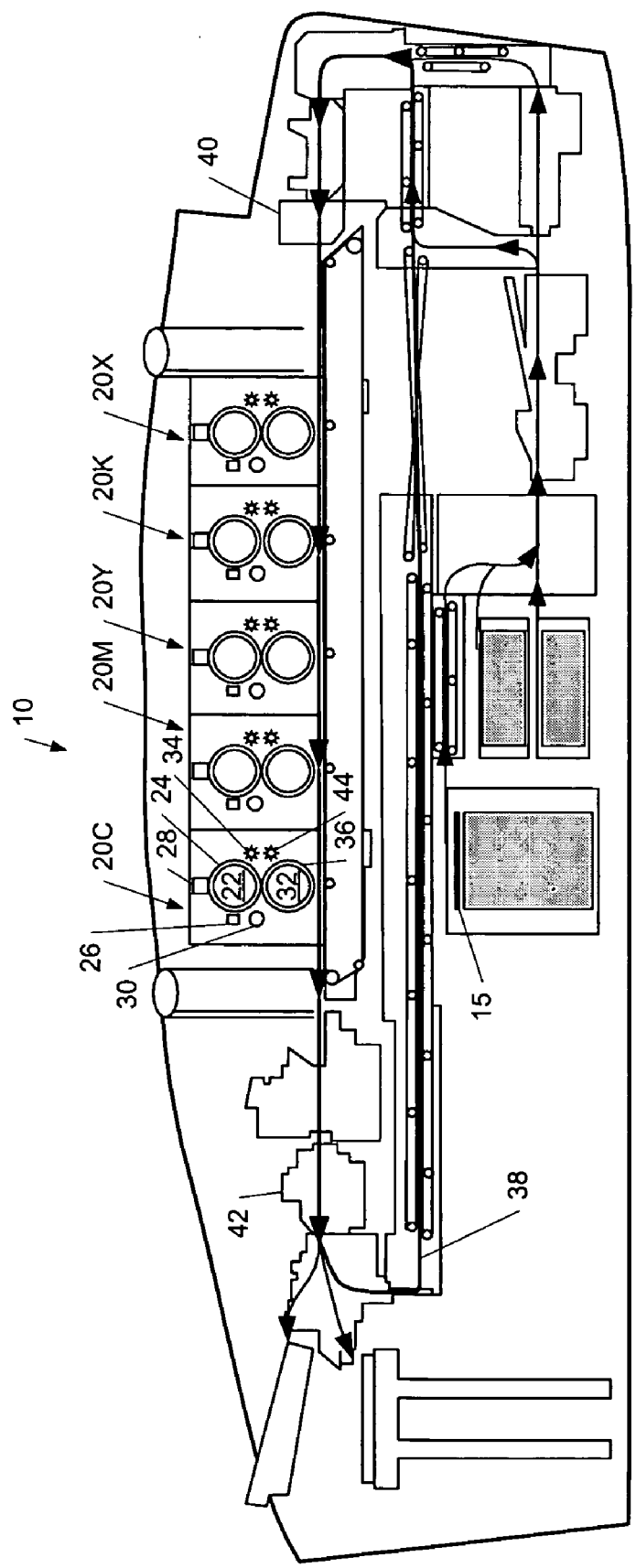
FIG. 1 illustrates a printer using dry electrophotographic printing and having five imaging modules in which the present invention can be implemented.

FIG. 1 shows a printer 10 that includes five imaging units 20C, 20M, 20Y, 20K, and 20X. The imaging units are also referred to as development modules or electrophotographic image-forming modules. These modules are generally arranged in tandem and are shown in FIG. 1 in a specific arrangement with cyan, magenta, yellow, black and a fifth module in order. This invention, however, is not limited to this or any other particular orientation. Each module includes elements that are similar from module to module and are shown in FIG. 1 to have similar referenced numerals with a suffix of C, M, Y, and K to refer to the module to which such element is respectively associated. Since each module is identical in construction, the specific elements specified herein are shown in FIG. 1 at one module only, but should be understood to apply in like manner to each module. Each module includes a primary image-forming member, for example, a drum or roller, 22. Each roller 22 has a respective photoconductive surface 24 having one or more layers upon which an image or a series of images is formed. To form a toned image, the outer surface of the rollers 22 are uniformly charged by a primary charger such as a corona charging device 26, or by any other suitable charger such as a roller charger, a brush charger, etc. The uniformly charged surface 24 is typically exposed by an image writer or exposure device 28, which is generally an LED or other electro-optical exposure device. Any alternative exposure device may be used, such as an optical exposure device to selectively alter the charge on the photoconductive surface 24 of the roller 22. The exposure device 28 creates an electrostatic image that corresponds to an image to be reduced or generated. This electrostatic image is developed by applying marking particles to the latent image on the photoconductive drum 22 by a toner developing module 30. Each toner development module 30 is associated with a particular type of toner marking particle and magnetic carrier particle, which is typically in a preferred toner concentration and is attracted by a certain voltage supplied by a power supply (not shown). The image is transferred onto a transfer drum 32. After the transfer is made from the photoconductive drum 22, the residual toner image is cleaned from the surface 24 of the drum 22 by a suitable cleaning device 34. The cleaning device 34 then prepares the surface 24 of the drum 22 for reuse to form subsequent toner images. The intermediate or transfer drum 32 likewise is coated by a transfer surface 36, which can include one or more layers. The intermediate transfer drums 32 are each cleaned by respective cleaning devices 44 to prepare the transfer drums for reuse.

The imaging units 20 generally are in contact with a transport device, such as the endless belt or web 38, which can include receiver members adhered thereto for receipt of the paper or other substrate 15 that is to receive the image. In the alternative, the belt or web 38 provided is not restricted to the belt or web shown in FIG. 1 since the image transfer can be made on any suitable surface capable of receiving paper or other substrate as it passes between the imaging units. The web 38 can also detachably retain the paper electrostatically or by mechanical devices such as grippers. Typically, receiver members are electrostatically adhered to belt 38 by the deposit of electrostatic charges from a charging device, such as, for example, by using a corona charger 40. A sheet of paper 15 is shown in FIG. 1 proceeding along the belt 38 through each of the five imaging modules.

As shown in FIG. 1, the transfer drum 32 interacts with the paper 15 along the belt 38 to transfer the electrostatic image from the transfer surface 36 of the transfer drum 32. The paper 15 then proceeds in sequential order through each developing module. Once the paper 15 has passed through each imaging unit 20, the paper 15 proceeds to a detack charger 42 to deposit a neutralizing charge on the paper 15 to separate the paper 15 from the belt 38. The paper 15 proceeds past the detack charger 42 and is transported to a remote location for operator retrieval. The transfer of images in each imaging unit 20 is performed without the application of heat to negate any fusing or centering of toner images transferred to the paper 15 until the paper enters a fuser (not shown) downstream. The paper 15 utilized herein can vary substantially in thickness and it is contemplated that this paper is not limiting in any manner. For example, the paper can be thin or thick, smooth or rough, include various paper stocks, transparency stock, plastic sheet materials, and foils.

Although not shown, appropriate sensors of any well-known type, such as mechanical, electrical, or optical sensors, generally are utilized in the printer to provide control signals for the printer. Such sensors may be located along the paper travel path along the belt 38, between the paper supply, and through the imaging units and the fusing module. Additional sensors may be associated with the photoconductive drums 22, the intermediate drums 32, any transferring mechanisms 24, 36, and any of the image processing modules. Accordingly, the sensors can be provided to detect the location of the paper through its travel path in relation to each of the imaging units and can transmit appropriate signals indicative of the paper location. Such signals are input into a logic and control unit (not shown), which can include a microprocessor. Based on such signals and on the microprocessor, the control unit can output signals to the printer to control the timing operations of the various development modules or imaging units to process images and to control a motor (not shown) that drives the various drums and belts.

The clear toner used in the present invention is used to create an insignia image. The problem with placing clear toner on top of other color toners in a one-step fusing process is that wherever the clear toner lands on the substrate, it changes the flow of the color toner below when it melts. Consequently, the color below the clear toner is not the same as the color of other portions of the substrate that do not have a clear toner on top. With the color toner below the clear toner being a halftone dot structure, the problem in matching colors between the portions of the substrate that do and do not have clear toner on top, becomes a complicated process. The image below the clear toner contains four separate layers and this continuous layer structure is a halftone dot structure. Different sized halftones combine to produce the illusion of continuous tones of gray and color.

Figure 2:
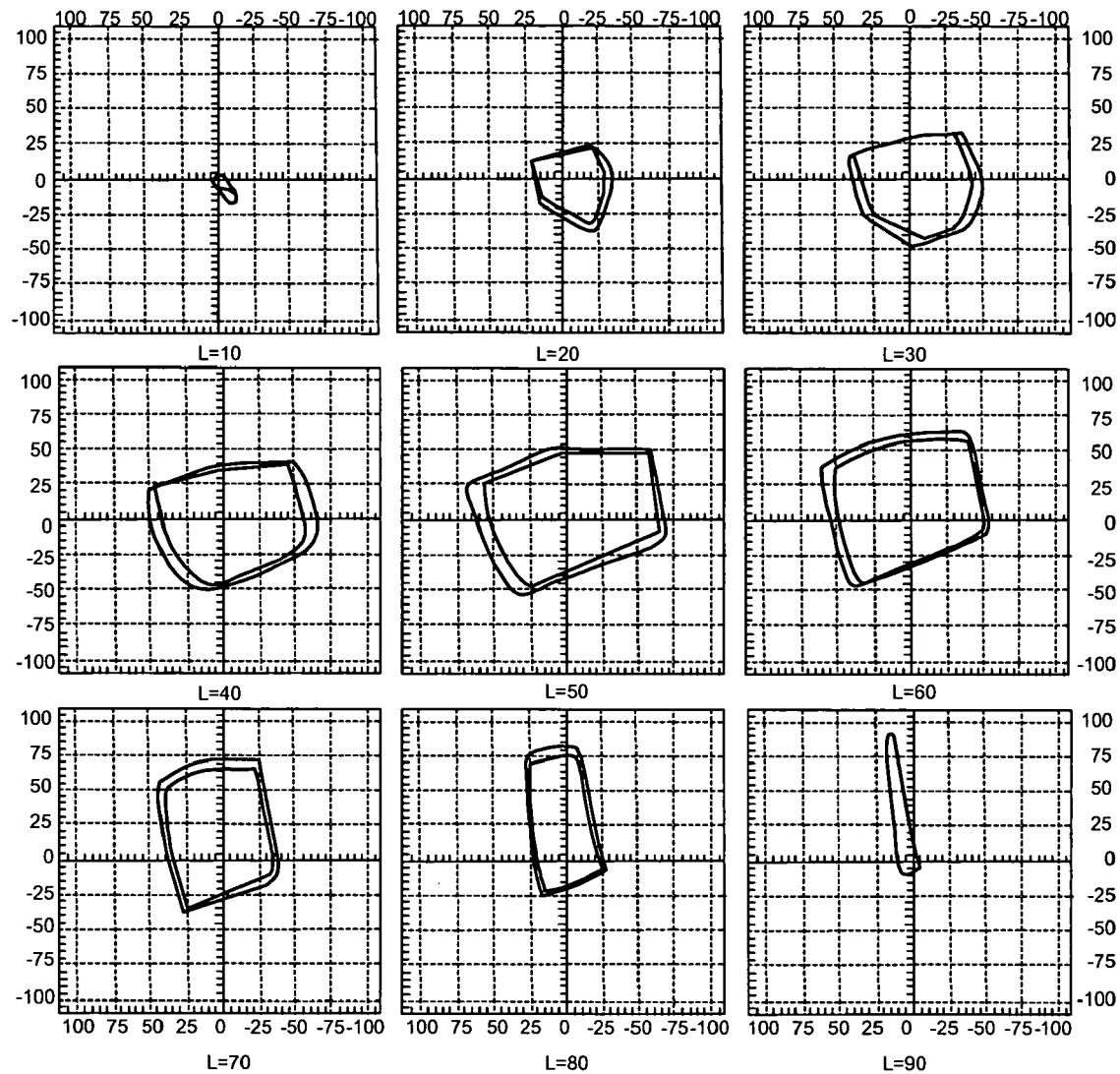
FIG. 2 illustrates a color gamut comparison for a color image, with and without the use of a transparent toner in accordance with an exemplary embodiment of the invention.

FIG. 2 shows a color gamut comparison for a color image, with and without use of a transparent toner. This figure shows the effect of the transparent toner, having similar viscosity to the four other color toners, on the color gamut of the four-color image below the transparent toner layer. The separate plots represent the color gamut cross section, with and without transparent toner, for lightness values in the Lab color space that range from L* of 10 to L* of 90 in increments of 10 units. In this particular case of toner/substrate/roller fusing combination, the color gamut was reduced with the addition of transparent toner on top. The maximum coverage is ~0.45 mg/cm2 for 100% clear toner as shown here.

Figure 3:
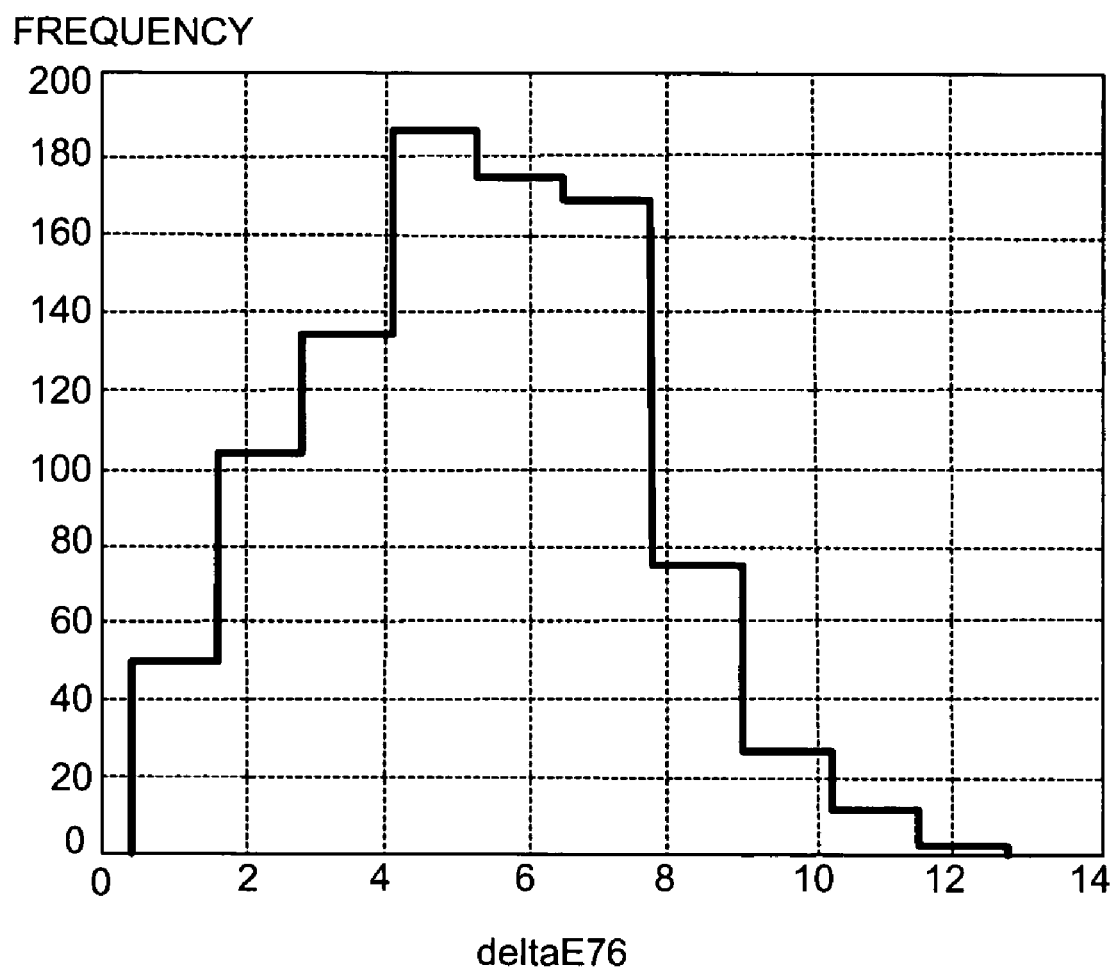
FIG. 3 illustrates a color error histogram of the in gamut color between a four-color process and a four-color process with transparent toner.

FIG. 3 shows the color error histogram of the in-gamut color, with respect to the four-color image, between the four-color process and the four color plus transparent toner process in the CIE color space. The numerical value for the difference between two colors in a color classification system is indicated by deltaE. DeltaE76 on the abscissa refers to the refined CIE color model standardized in 1976 and referred to as CIE Lab.

Since the color profile for both profile A (4-color process) and profile B (4-color process plus transparent toner) can be built for the process conditions mentioned, the desired profile B can be used for the 4-color image below the region where the transparent toner insignia occurs. Likewise, for the region where the 4-color image does not have the transparent toner insignia on top, profile A can be used for the 4-color image. Consequently, better color matching can be obtained between the region that has a transparent toner insignia on top and the adjacent region where there is no transparent toner on top.

Color management is the calibration of all input and output devices within an image processing chain in order to obtain the desired color independently of the devices used. Color management ensures that optimum color reproduction occurs regardless of the input device, monitor and output device used, as long as the device is characterized by an International Color Consortium (ICC) profile. The color management process involves several steps: (1) converting the color values of the input device into device-independent color values; (2) establishing the process for outputting the image; and (3) converting the color values of the image into process-specific output values (e.g., CMYK) with the assistance of the color profile of the output process. Color profile represents a numerical connection between the values of the image input or output device and the CIE color values XYZ or L*a*b. The color profiles produced for the input or output device are device specific and are also determined by the operating conditions of the device and its calibration.

Figure 4:
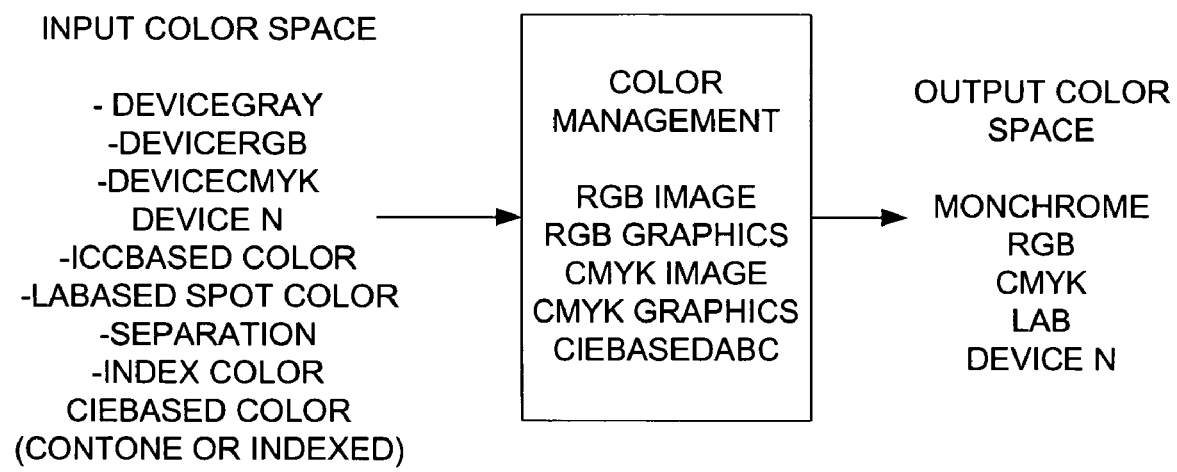
FIG. 4 illustrates a typical color management model for a printer in which the present invention can be utilized.

FIG. 4 shows a typical color management module (CMM) for a profile A operation, in which the input data can have the different types of color space use (e.g., from DeviceGray, DeviceRGB, DeviceCMYK, etc). In the output color space, profile A could be for a CMYK output space. The target profile transformation from Lab color to Data color space is tuned for the transformation from the Lab color space to the 4-color CMYK process output color space. In a similar five color operation with transparent toner as the fifth imaging module so that transparent insignia (e.g., authentication marks) can be written on top of the 4-color toner, the target profile transformation for profile B is now different in order to map to the CMYK space and create a similar color as in profile A with the same output color adjustment input.

Figure 5:
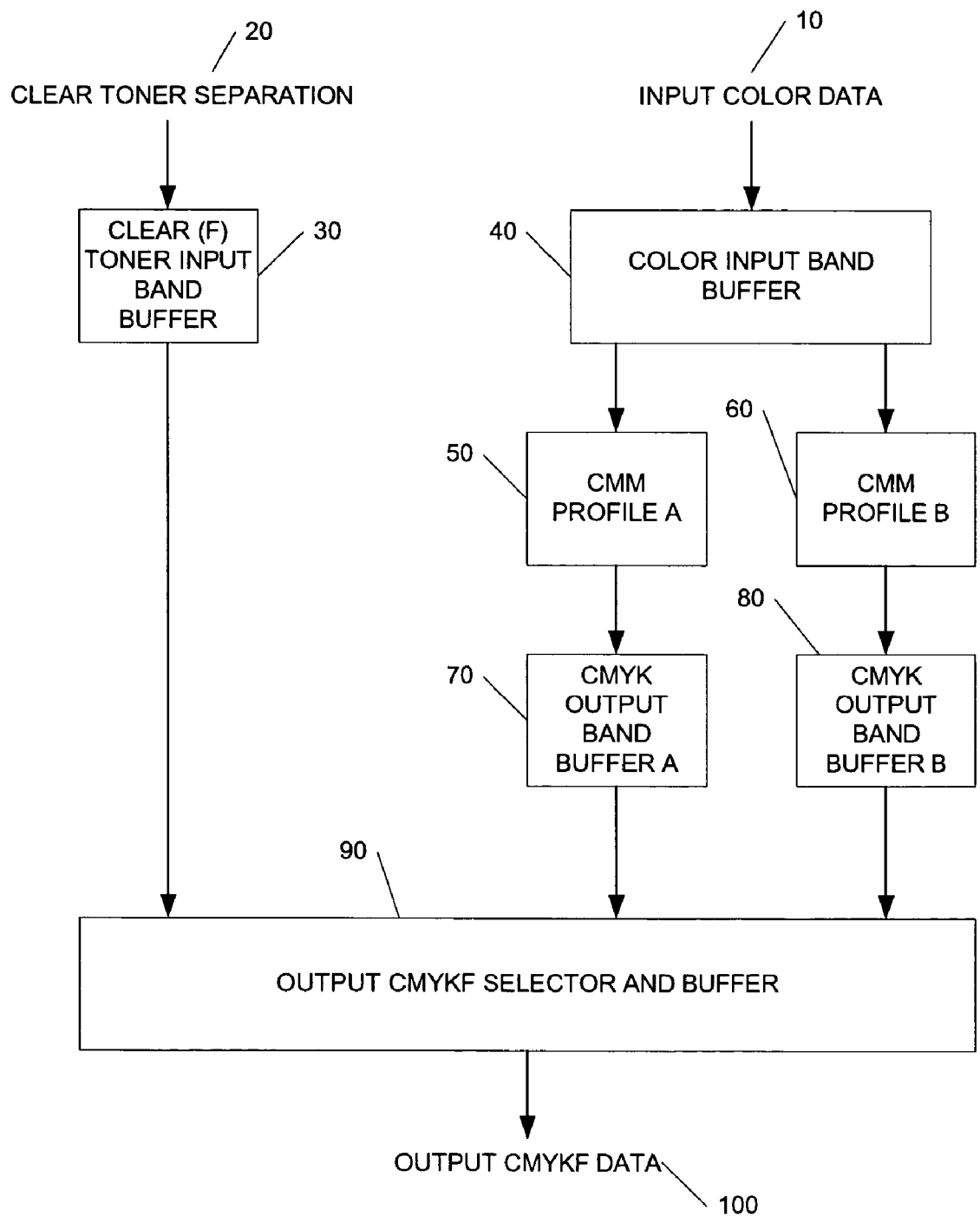
FIG. 5 illustrates band processing color correction with transparent toner image insignia in accordance with an exemplary embodiment of the invention.

There are several ways to combine the outputs from these two color profiles based on whether or not there is transparent toner on top. FIG. 5 illustrates one of these methods with an image band processing system. In this case, the image data includes the clear toner separation 20 and the input color data 10 (e.g., from DeviceRGB, DeviceCMYK, etc.) that are buffered in input image band buffers 40. The image band buffer data are processed through the CMM profiles A and B indicated in FIG. 5 by blocks 50, 60, respectively. The processed image data (e.g., CMYK data) is stored in output image band buffers 70, 80 for each profile. The CMM processing for profiles A (block 50) and B (block 60) can be performed either sequentially or in parallel. Then the CMYK output data for profile A (block 70) and for profile B (block 80) go through an output CMYKF selector and buffer block 90. The clear (F) toner input band buffer data (block 30) is used to select which one of the output CMYK signals 100, either profile A (block 70) or profile B (block 80), at the per pixel level to send to the output printing unit with the clear toner signal on the fifth imaging module.

In the case where the color image with the transparent clear toner on top (i.e., profile B) exhibits lower saturation than the color image without the transparent toner on top (i.e., profile A), and with a similar output CMYK signal, the full output range can be used in building profile B. The full output range would be 0-255 in a gray level printing system for the CMYK separations. Gray scale values are 8-bit images representing up to 256 shades of gray. In the case of profile A, a profile will need to be created that utilizes less than the full output range. For example, 0-220 could be used in a gray level printing system for the CMYK separations.

In the calibration step for profile building, the output L*a*b* value of these two processes with the same RGB input value can be matched. Another way to approach this problem is to map profile A with the full range of gray values (0-255) but load a different Lab to Lab transformation in 4-color printing when a fifth transparent toner image data is present and the color compensation function is selected. Therefore, color matching between 4-color areas with and without clear toner on top can be achieved. This function can of course be switched off, when the transparent insignia is being printed in an area of no color toner at all in the whole image, or when color matching is not desired in a certain region that will need a flag (a separate input) to identify that region in the output selector block. Then the steps of band buffering and processing are repeated until the image processing is completed. In order not to lose color saturation in a 4-color process the 0-255 gray value signals are super-saturated so that the 200 gray value signals will still produce a saturated color as in a normal 4-color printing process. Saturation represents the amount of gray present in a color.

Another implementation of this color correction method is to create tags, using the information from the clear toner image data, and inserting tag data with the input color data. Within the CMM model illustrated in FIG. 4, multiple color transformations that respond to different colors and tags can be created. Thus, the color mapping with and without the transparent toner image on top can be processed in one step to output data to the printhead electronics.

Clear dry ink (CDI) texture level can vary from 0% to 100% on a per pixel basis in a drawing image. The CDI top image can be a texture image of a varying gray level (e.g., from 0 to 255 as an 8-bit digital value, or from 0% to 100% in clear toner coverage). The CDI can be in continuous tone or in halftone (e.g., binary or gray level halftones).

For different transparent toner laydown/media/fusing choices, different color profiles (e.g., profile B) can be created as companions to the regular profile (e.g., profile A), so that the color of the image with transparent toner on top, of different amounts, can be matched to the 4-color image without clear toner, but with different gloss levels. There are several variation of this embodiment that support multiple profiles for different colors/gloss that can be run on the same page.

In a color management model, there are certain color mapping intents for color profiles. One of the mapping intents is referred to as a perceptual intent. What this means is that the color management model is attempting to make a picture look good perceptually. Typically, exact color reproduction is not preferred. There are several reasons for this. For example, consider the situation where the printer output gamut is small compared with the real world. If exact color reproduction is desired, then the out of gamut colors in some hue angle will look the same for each color. In other words, there is no distinction between the colors and the pictures will look bad with the saturated colors all being clipped. Therefore, perceptual intent results in mapping of a color not exactly, but "pleasingly". On the other hand, for exact color reproduction, absolute calorimetric intent is chosen to have accurate color reproduction.

Within a color model, an input color space (e.g., device RGB) can be linked to an output color space (e.g., CMYK separations for printing) via color profiles. The device RGB input can have different objects such as an RGB image and RGB graphics. The color profiles for those different interpretations of color space and objects are used by the color management system to map the input color space (i.e., RGB and object type) to an output color space (CMYK). When usage of the color management model is selected, the user can also specify the intent. For an RGB image, the user can use perceptual intent. For RGB Graphics, the user can use absolute colorimetric intent. Thus, the process includes treating the input images as one object, mapping the input images through the perceptual intent of one profile first, to get a LAB output, and taking that LAB output as an input to another profile. In this case, the mapping can be set to absolute colorimetric intent to obtain a CMYK separation output.

Figure 6:
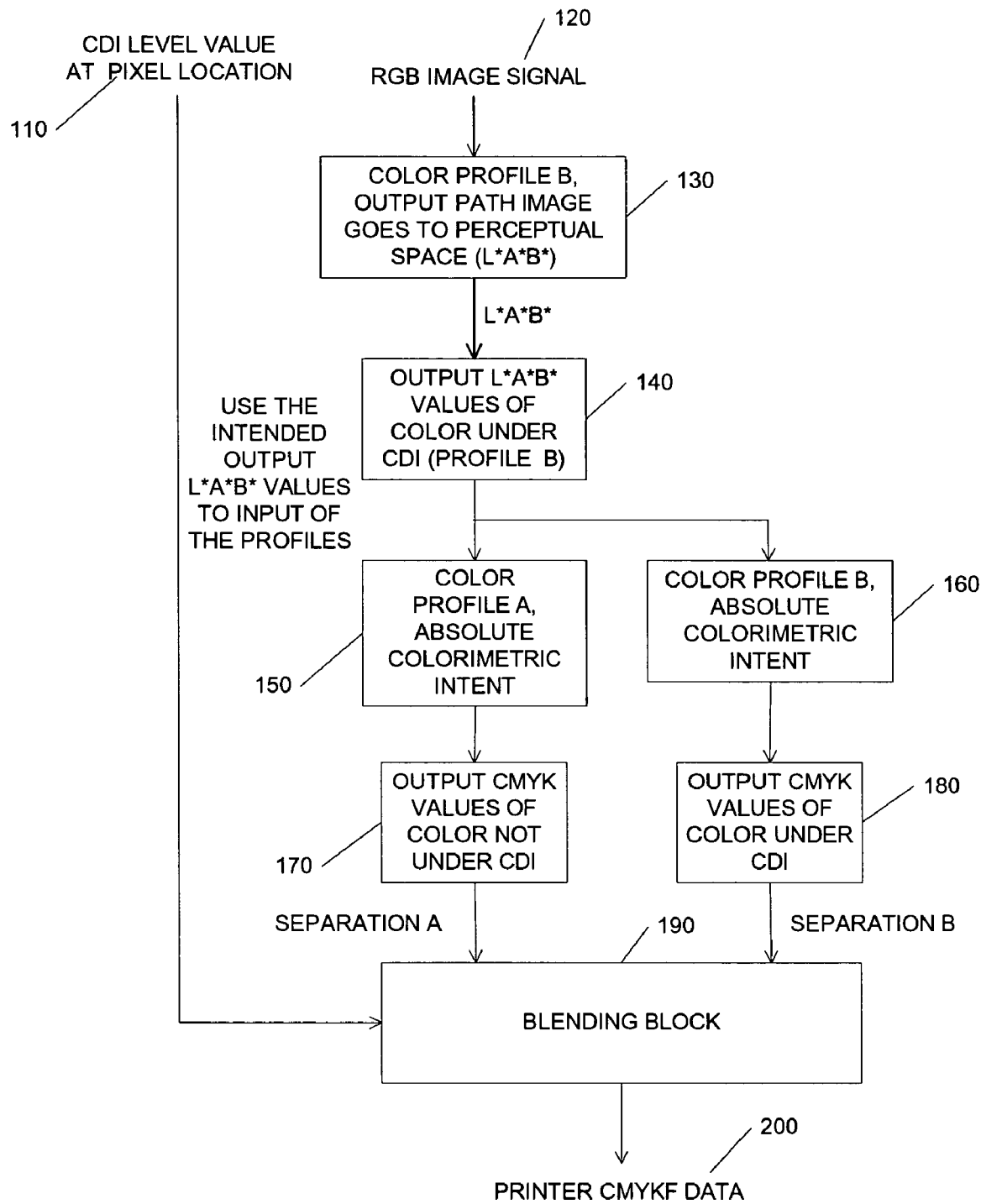
FIG. 6 illustrates band processing color correction for multiple color profiles on a per pixel basis in accordance with an exemplary embodiment of the invention.

FIG. 6 illustrates band processing color correction for multiple color profiles (i.e., different gray values) on a per pixel basis to accommodate various amounts of transparent toner on top of a four-color image. In other words, the top dry ink (DI) level may not be 100% clear in which instance a blending operation can be performed using the two color profiles, i.e., profile A and profile B discussed above. The top layer can represent a plurality of gray values corresponding to each pixel location. The blending operation may also be needed to take into consideration registration errors so that the edges of the clear toner top insignia can be blurred by a few pixels. In this figure, an RGB image signal 120 is input into the CMM module (block 130) where the input is mapped to the perceptual L*a*b color space. The output L*a*b values of color under the clear dry ink (CDI) level (e.g., profile B) is represented in block 140. The intended L*a*b output values are then input to color profiles A (block 150) and B (block 160). As indicated in FIG. 6, block 150 represents the absolute calorimetric intent for color profile A. Likewise, block 160 represents the absolute colorimetric intent for color profile B. The outputs from blocks 150 and 160 are the output CMYK values of color not under the CDI (i.e., no amount of clear toner on top) in block 170, and the output CMYK values of color under the CDI in block 180. This results in separation A from block 170 and separation B from block 180. Separations A and B are blended in blending block 190 with further input 110 of the CDI level value at each pixel location. The result of the blending operation, further illustrated in FIG. 7, results in the printer CMYKF data 200 for each pixel in the image.

Figure 7:
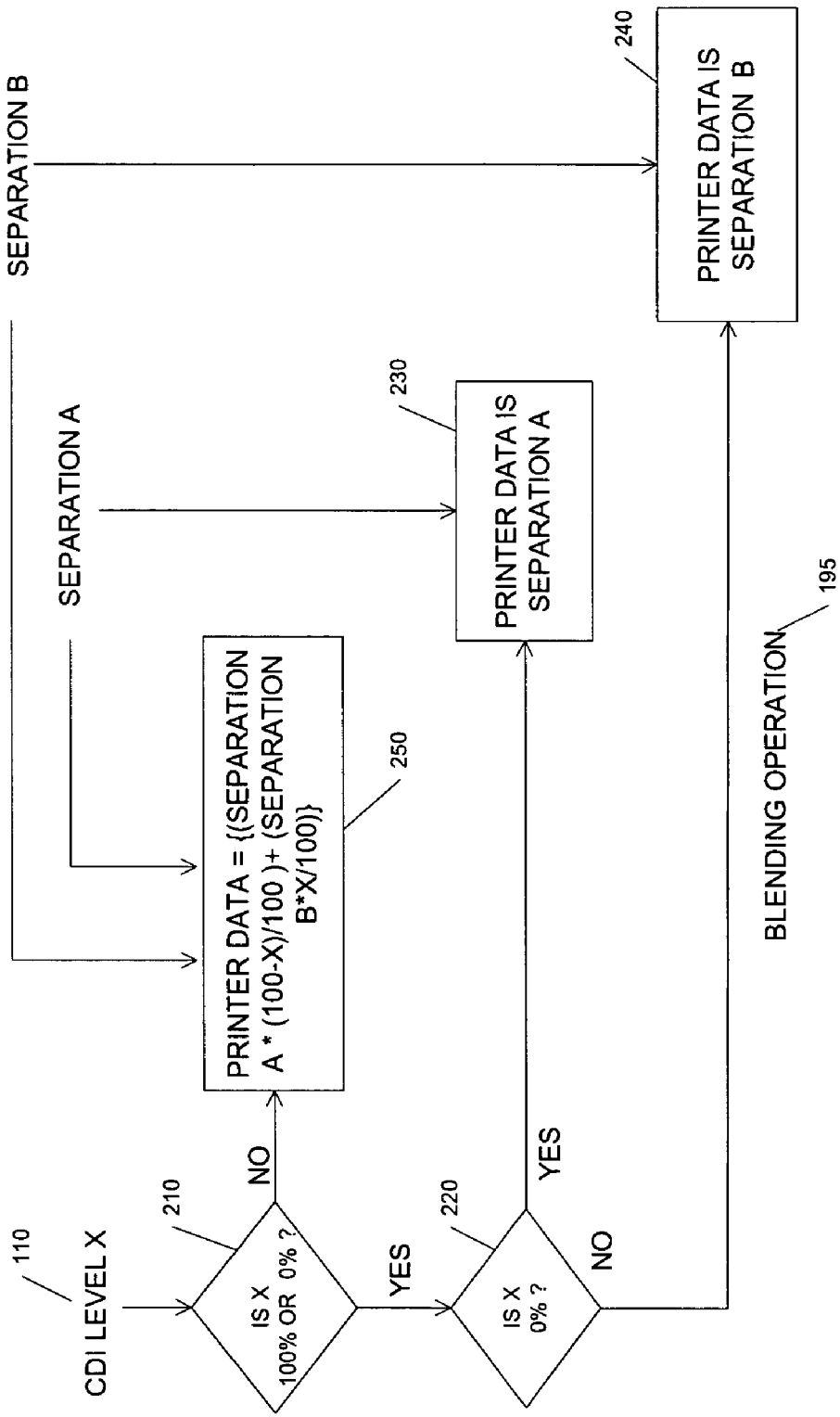
FIG. 7 illustrates an exemplary blending operation algorithm applicable to color correction with multiple color profiles.

The blending operation 195 performed by blending block 190 as shown in more detail in FIG. 7. The CDI level value X 110 is input into blending processing logic decision block 210 to determine if the CDI level value is 0% or 100%. This represents the same binary processing performed in block 90 of FIG. 4. If the CDI level value is 0% or 100% then decision block 220 is entered to more specifically determine if the CDI level value is 0%. A CDI level value of 0% means that the printer separation data for the pixel location is separation A as indicated in block 230 (four-color process without transparent toner). Otherwise, the printer separation data for the pixel location is separation B as indicated in block 240 (corresponding to profile B discussed above). If the CDI level value is other than 0% or 100%, then the blending operation is performed as indicated in block 250. As an example, assume the CDI level value is 80%. Then according to the processing logic of block 250, the printer data is a weighting of separation A and separation B such that the printer output data for the pixel location is separation A*1/5+separation B*4/5.

It will be understood by those skilled in the art that while the foregoing has been described with reference to preferred embodiments and features, various modifications, variations, changes and additions can be made thereto without departing from the spirit and scope of the invention.

PARTS LIST

10 printer
15 paper
20 imaging unit
22 drum/roller
24 surface
26 changer
28 exposure device
30 toner development station
32 transfer drum
34 cleaning device
36 transfer surface
38 belt or web
40 corona charger
42 detack charger
44 cleaning devices

What is claimed is:

1. A method for color correction of an image having an insignia portion in a multi-module printer, comprising the steps of:
    calibrating a first color profile for a four-color image;
    calibrating a second color profile for a four-color image with a transparent toner layer on top of the insignia portion of the four-color image;
    buffering a plurality of image data in a color input band buffer;
    processing the plurality of image data in the color input band buffer through the first and second color profiles in a color management module;
    storing the processed image data in an output band buffer corresponding to image data processed through each color profile;
    comparing a clear toner input band data stored in a clear toner input band buffer with the processed image data in each output band buffer to select an output signal on a per pixel basis to send to the multi-module printer.

2. The method for color correction of an image having an insignia portion of claim 1 wherein the step of calibrating a first color profile comprises setting an output range of colors for the first color profile that is less than an output range in an output color space for the second profile in order to provide an approximate match to an actual output gamut range of the second profile.

3. The method for color correction of an image having an insignia portion of claim 1 wherein the step of calibrating a second color profile comprises setting an output range of colors for the second color profile that is equal to a maximum possible output range for an output color space.

4. The method for color correction of an image having an insignia portion of claim 1 wherein the multi-module printer has at least four color imaging modules.

5. The method for color correction of an image having an insignia portion of claim 4 wherein the four color imaging modules provide a four-color gamut.

6. The method for color correction of an image having an insignia portion of claim 5 wherein the four-color gamut represents a specific color space.

7. The method for color correction of an image having an insignia portion of claim 4 wherein the multi-module printer further comprises a transparent toner module.

8. The method for color correction of an image having an insignia portion of claim 4 wherein each color imaging module includes a specific color toner.

9. The method for color correction of an image having an insignia portion of claim 1 further comprising the step of matching the color of the image under the insignia portion with the color of the image that is not under the insignia portion.

10. The method for color correction of an image having an insignia portion of claim 9 wherein the step of matching comprises creating a tag for the four-color image under the insignia portion so that the second color profile is used for the portion under the insignia that provides a larger gamut than the first color profile used for a remaining portion of the image.

11. The method for color correction of an image having an insignia portion of claim 1 further comprising the step of calibrating at least an additional color profile to provide for a plurality of gloss effects that depend on an amount of transparent toner laydown.

12. The method for color correction of an image having an insignia portion of claim 1 wherein the step of processing the plurality of image data comprises a mapping of an image in the input color space to an output color space though the first and second color profiles.

13. The method for color correction of an image having an insignia portion of claim 12 wherein the input image in the input color space includes a plurality of different objects.

14. The method for color correction of an image having an insignia portion of claim 13 wherein the input image includes a graphic object.

* * * * *